United States Patent
Cher et al.

(10) Patent No.: US 8,571,847 B2
(45) Date of Patent: Oct. 29, 2013

(54) EFFICIENCY OF STATIC CORE TURN-OFF IN A SYSTEM-ON-A-CHIP WITH VARIATION

(75) Inventors: Chen-Yong Cher, Port Chester, NY (US); Paul W. Coteus, Yorktown Heights, NY (US); Alan Gara, Mount Kisco, NY (US); Eren Kursun, Ossining, NY (US); David P. Paulsen, Dodge Center, MN (US); Brian A. Schuelke, Rochester, MN (US); John E. Sheets, II, Zumbrota, MN (US); Shurong Tian, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/727,984

(22) Filed: Mar. 19, 2010

(65) Prior Publication Data

US 2011/0172984 A1 Jul. 14, 2011

Related U.S. Application Data

(60) Provisional application No. 61/293,569, filed on Jan. 8, 2010.

(51) Int. Cl.
*G06G 7/75* (2006.01)

(52) U.S. Cl.
USPC ............. 703/17; 703/13; 703/16; 703/18

(58) Field of Classification Search
USPC .......................... 703/13, 14; 718/1
See application file for complete search history.

(56) References Cited

U.S. PATENT DOCUMENTS

| | | | | |
|---|---|---|---|---|
| 5,862,394 A | * | 1/1999 | Watts et al. | 713/330 |
| 7,272,732 B2 | * | 9/2007 | Farkas et al. | 713/320 |
| 7,310,737 B2 | * | 12/2007 | Patel et al. | 713/300 |
| 7,440,297 B2 | * | 10/2008 | Adragna et al. | 363/50 |
| 7,472,038 B2 | | 12/2008 | Bose et al. | |

(Continued)

OTHER PUBLICATIONS

M. A. Alam, "A Critical Examination of the Mechanics of Dynamic NBTI for PMOSFETs," in Proc. Int. Electron Devices Meeting (IEDM), pp. 14.41-14.4.4, 2003.

(Continued)

*Primary Examiner* — Saif Alhija
*Assistant Examiner* — Kibrom Gebresilassie
(74) *Attorney, Agent, or Firm* — Scully, Scott, Murphy & Presser, P.C.; Daniel P. Morris, Esq.

(57) ABSTRACT

A processor-implemented method for improving efficiency of a static core turn-off in a multi-core processor with variation, the method comprising: conducting via a simulation a turn-off analysis of the multi-core processor at the multi-core processor's design stage, wherein the turn-off analysis of the multi-core processor at the multi-core processor's design stage includes a first output corresponding to a first multi-core processor core to turn off; conducting a turn-off analysis of the multi-core processor at the multi-core processor's testing stage, wherein the turn-off analysis of the multi-core processor at the multi-core processor's testing stage includes a second output corresponding to a second multi-core processor core to turn off; comparing the first output and the second output to determine if the first output is referring to the same core to turn off as the second output; outputting a third output corresponding to the first multi-core processor core if the first output and the second output are both referring to the same core to turn off.

27 Claims, 10 Drawing Sheets

(56) References Cited

U.S. PATENT DOCUMENTS

| | | | |
|---|---|---|---|
| 7,486,107 B1 | 2/2009 | Bose et al. | |
| 7,681,081 B2* | 3/2010 | Wang | 714/36 |
| RE43,516 E * | 7/2012 | Adragna et al. | 363/50 |
| 2001/0003207 A1* | 6/2001 | Kling et al. | 713/320 |
| 2002/0169580 A1 | 11/2002 | Lehoczky | |
| 2002/0171398 A1* | 11/2002 | Odaohhara | 320/128 |
| 2003/0015983 A1* | 1/2003 | Montero et al. | 318/473 |
| 2003/0125886 A1* | 7/2003 | Spitaels et al. | 702/62 |
| 2003/0154291 A1* | 8/2003 | Ocheltree et al. | 709/228 |
| 2004/0003303 A1* | 1/2004 | Oehler et al. | 713/300 |
| 2004/0264124 A1* | 12/2004 | Patel et al. | 361/686 |
| 2004/0268166 A1* | 12/2004 | Farkas et al. | 713/320 |
| 2005/0021279 A1 | 1/2005 | Kuepper et al. | |
| 2007/0255972 A1 | 11/2007 | Gaskins et al. | |
| 2008/0036487 A1 | 2/2008 | Bradley et al. | |
| 2008/0036613 A1 | 2/2008 | Gaskins et al. | |
| 2008/0082848 A1* | 4/2008 | Wang | 713/330 |
| 2008/0126748 A1 | 5/2008 | Capps et al. | |
| 2008/0141072 A1 | 6/2008 | Kalgren et al. | |
| 2008/0172578 A1* | 7/2008 | Tsai | 714/36 |
| 2009/0089033 A1 | 4/2009 | Ringering et al. | |
| 2009/0271437 A1 | 10/2009 | Armour et al. | |
| 2009/0287909 A1 | 11/2009 | Vera et al. | |
| 2009/0288092 A1* | 11/2009 | Yamaoka | 718/104 |
| 2010/0017655 A1* | 1/2010 | Gooding et al. | 714/16 |
| 2010/0084991 A1* | 4/2010 | Liu et al. | 315/291 |
| 2010/0127881 A1* | 5/2010 | Schechter et al. | 340/584 |
| 2010/0306737 A1* | 12/2010 | Hamilton, II et al. | 717/110 |
| 2011/0016251 A1* | 1/2011 | Ho | 710/310 |
| 2011/0265090 A1 | 10/2011 | Moyer et al. | |

OTHER PUBLICATIONS

United States Office Action dated Jun. 6, 2012 from related U.S. Appl. No. 12/727,967.

United States Office Action dated Nov. 23, 2012 from related U.S. Appl. No. 12/727,967.

Notice of Allowance dated Feb. 15, 2013 from related U.S. Appl. No. 12/727,967.

http://www.iue.tuwien.ac.at/phd/wittmann/node10.html#SECTION00102000000000000000 "NBTI Reliability Analysis", pp. 1-20, Jun. 1, 2007.

Alam, M. A. et al., "A Comprehensive Model of PMOS NBTI Degradation," Microelectronics Reliability, vol. 45, No. 2005, pp. 71-81, 2004.

Ogawa, S. et al., "Generalized Diffusion-Reaction Model for the Low-Field Charge-Buildup Instability at the Si-SiO2 Interface," Physical Review B, vol. 51, No. 7, pp. 4218-4230, 1995.

* cited by examiner

| BREAK-EVEN CONDITIONS | STATIC TURN - OFF LIST (ORDERED LEFT TO RIGHT) |
|---|---|
| IF (COUNT[CORE 2] > COUNT[CORE 1] - 100 AND COUNT[CORE1] <= COUNT[CORE 3]) | TURN OFF CORE1, CORE 2, CORE 3 |
| IF (COUNT[CORE 2] <= COUNT[CORE 1] - 100 AND COUNT[CORE1] > COUNT[CORE 3]) | TURN OFF CORE 2, CORE 3, CORE 1 |
| IF (COUNT[CORE 2] > COUNT[CORE 1] - 100 AND COUNT[CORE1] > COUNT[CORE 3]) | TURN OFF CORE 3, CORE 1, CORE 2 |
| IF (COUNT[CORE 2] > COUNT[CORE 1] - 100 AND COUNT[CORE1] <= COUNT[CORE 3]) | TURN OFF CORE 1, CORE 3, CORE 2 |
| IF (COUNT[CORE 2] <= COUNT[CORE 1] - 100 AND COUNT[CORE1] <= COUNT[CORE 3]) | TURN OFF CORE 2, CORE 1, CORE 3 |
| IF (COUNT[CORE 2] > COUNT[CORE 1] - 100 AND COUNT[CORE1] > COUNT[CORE 3]) | TURN OFF CORE 3, CORE 2, CORE 1 |

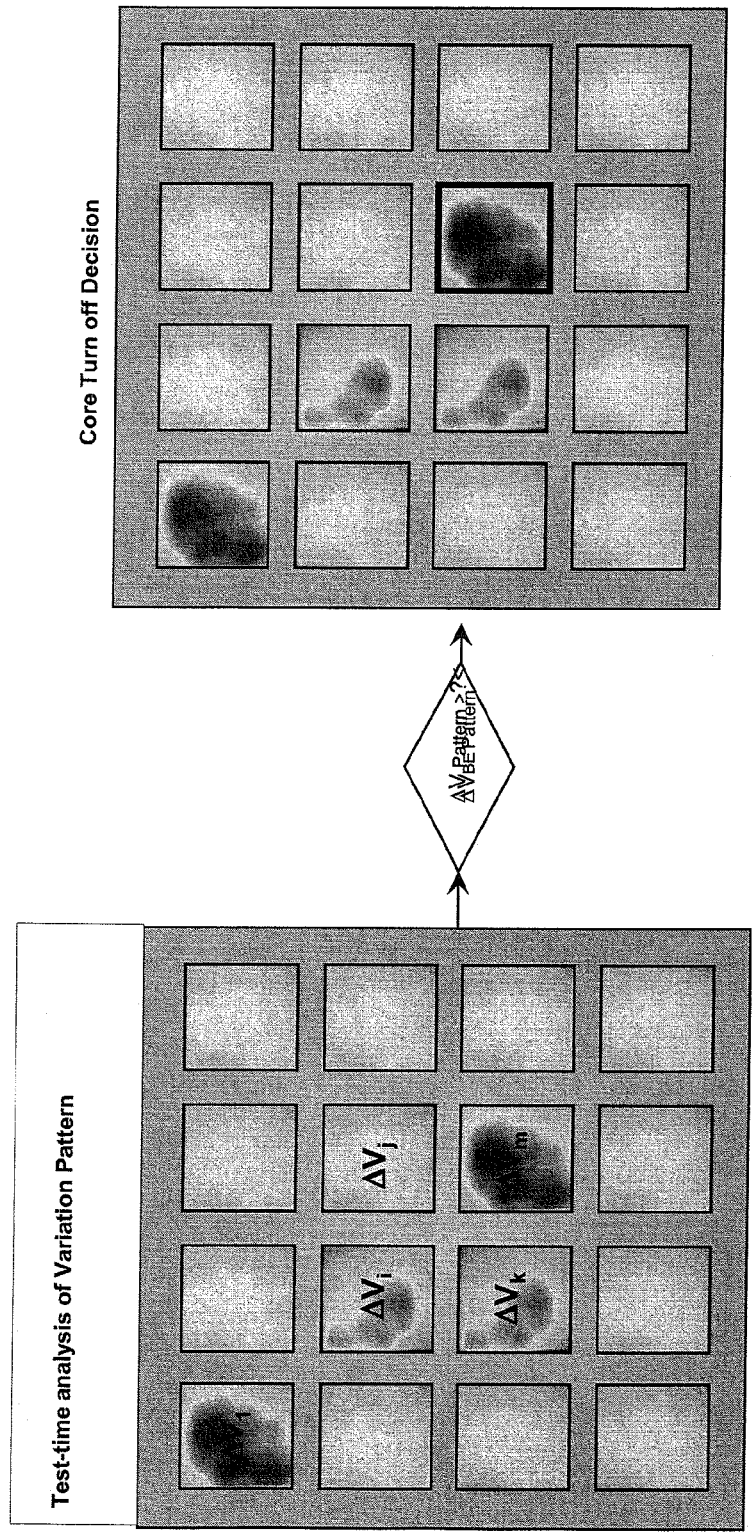
Figure 8. Test-time and Design-time Stages in Core Turn off decision process

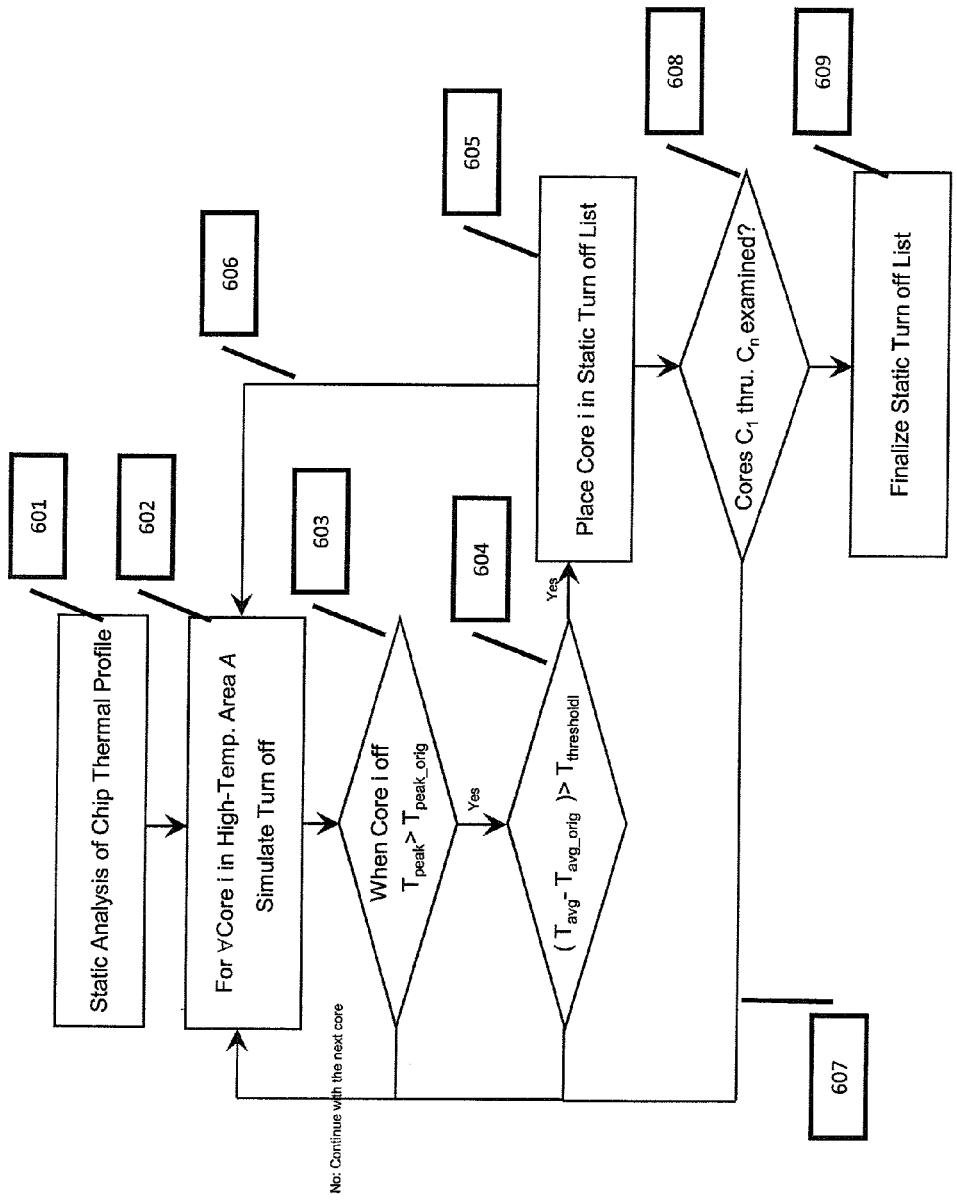
Figure 9. Extracting Static Core Turn off List

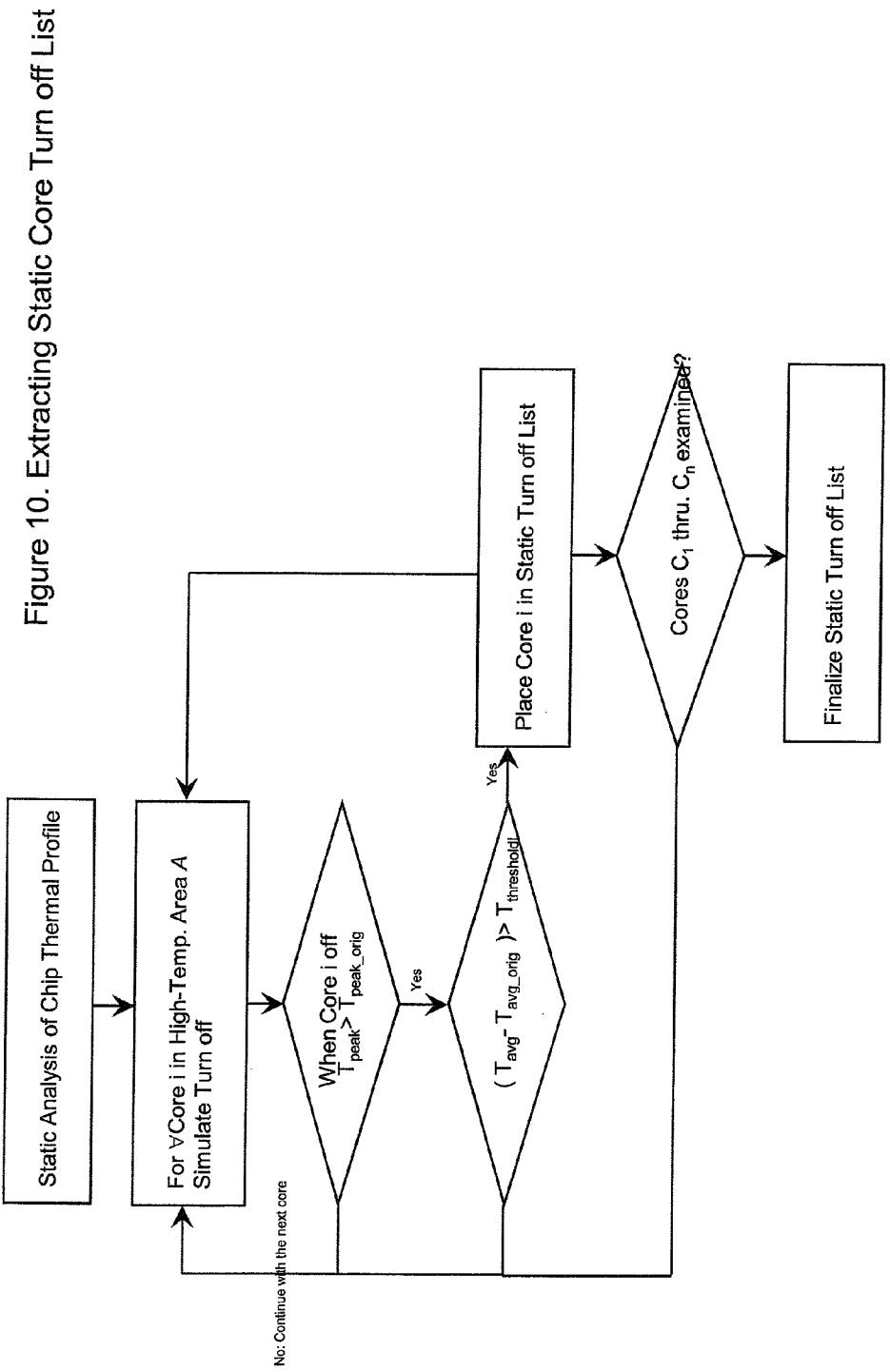

EFFICIENCY OF STATIC CORE TURN-OFF IN A SYSTEM-ON-A-CHIP WITH VARIATION

PRIORITY CLAIM

This disclosure claims priority from U.S. Provisional Patent Application No. 61/293,569, filed on Jan. 8, 2010, the entire contents and disclosure of which is expressly incorporated by reference herein as if fully set forth herein.

STATEMENT REGARDING FEDERALLY SPONSORED RESEARCH OR DEVELOPMENT

The present disclosure was made with the U.S. Government support under Contract No.: B554331 awarded by the U.S. Department of Energy. The U.S. Government has certain rights in this disclosure.

CROSS-REFERENCE TO RELATED APPLICATIONS

The present disclosure is related to the following commonly-owned, co-pending United States Patent Applications, the entire contents and disclosure of each of which is expressly incorporated by reference herein as if fully set forth herein. U.S. patent application Ser. No. 12/684,367, U.S. Pat. No. 8,275,954, for "USING DMA FOR COPYING PERFORMANCE COUNTER DATA TO MEMORY"; U.S. patent application Ser. No. 12/684,172, U.S. Pat. No. 8,275,964, for "HARDWARE SUPPORT FOR COLLECTING PERFORMANCE COUNTERS DIRECTLY TO MEMORY"; U.S. patent application Ser. No. 12/684,190, for "HARDWARE ENABLED PERFORMANCE COUNTERS WITH SUPPORT FOR OPERATING SYSTEM CONTEXT SWITCHING"; U.S. patent application Ser. No. 12/684,496, for "HARDWARE SUPPORT FOR SOFTWARE CONTROLLED FAST RECONFIGURATION OF PERFORMANCE COUNTERS"; U.S. patent application Ser. No. 12/684,429, U.S. Pat. No. 8,347,001, for "HARDWARE SUPPORT FOR SOFTWARE CONTROLLED FAST MULTIPLEXING OF PERFORMANCE COUNTERS"; U.S. patent application Ser. No. 12/697,799, for "DISTRIBUTED PERFORMANCE COUNTERS"; U.S. patent application Ser. No. 12/684,738, for "LOCAL ROLLBACK FOR FAULT-TOLERANCE IN PARALLEL COMPUTING SYSTEMS"; U.S. patent application Ser. No. 12/696,780, U.S. Pat. No. 8,103,910, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, U.S. Pat. No. 8,268,389, for "PRECAST THERMAL INTERFACE ADHESIVE FOR EASY AND REPEATED, SEPARATION AND REMATING"; U.S. patent application Ser. No. 12/684,184, U.S. Pat. No. 8,359,404, for "ZONE ROUTING IN A TORUS NETWORK"; U.S. patent application Ser. No. 12/684,852, for "PROCESSOR WAKEUP UNIT"; U.S. patent application Ser. No. 12/684,642, for "TLB EXCLUSION RANGE"; U.S. patent application Ser. No. 12/684,804, U.S. Pat. No. 8,356,122, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, U.S. Pat. No. 8,086,766, for "SUPPORT FOR NON-LOCKING PARALLEL RECEPTION OF PACKETS BELONGING TO THE SAME MESSAGE"; U.S. patent application Ser. No. 12/688,773, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/696,825, U.S. Pat. No. 8,255,633, for "LIST BASED PREFETCH"; U.S. patent application Ser. No. 12/684,693, U.S. Pat. No. 8,347,039, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 12/731,796, U.S. Pat. No. 8,359,367, for "NETWORK SUPPORT FOR SYSTEM INITIATED CHECKPOINTS"; U.S. patent application Ser. No. 12/696,746, U.S. Pat. No. 8,327,077, for "TWO DIFFERENT PREFETCH COMPLEMENTARY ENGINES OPERATING SIMULTANEOUSLY"; U.S. patent application Ser. No. 12/697,015, U.S. Pat. No. 8,364,844, for "DEADLOCK-FREE CLASS ROUTES FOR COLLECTIVE COMMUNICATIONS EMBEDDED IN A MULTI\-DIMENSIONAL TORUS NETWORK"; U.S. patent application Ser. No. 12/727,967, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175, for "I/O ROUTING IN A MULTIDIMENSIONAL TORUS NETWORK"; U.S. patent application Ser. No. 12/684,287, U.S. Pat. No. 8,370,551, for "ARBITRATION IN CROSSBAR FOR LOW LATENCY"; U.S. patent application Ser. No. 12/684,630, U.S. Pat. No. 8,312,193, for "EAGER PROTOCOL ON A CACHE PIPELINE DATAFLOW"; U.S. patent application Ser. No. 12/723,277, for "EMBEDDED GLOBAL BARRIER AND COLLECTIVE IN A TORUS NETWORK"; U.S. patent application Ser. No. 12/696,764, for "GLOBAL SYNCHRONIZATION OF PARALLEL PROCESSORS USING CLOCK PULSE WIDTH MODULATION"; U.S. patent application Ser. No. 12/796,411, for "IMPLEMENTATION OF MSYNC"; U.S. patent application Ser. No. 12/796,389, for "NON\-STANDARD FLAVORS OF MSYNC";

U.S. patent application Ser. No. 12/696,817, for "HEAP/STACK GUARD PAGES USING A WAKEUP UNIT"; U.S. patent application Ser. No. 12/697,164, for "MECHANISM OF SUPPORTING SUB-COMMUNICATOR COLLECTIVES WITH 0(64) COUNTERS AS OPPOSED TO ONE COUNTER FOR EACH SUB-COMMUNICATOR"; and U.S. patent application Ser. No. 12/774,475, for "REPRODUCIBILITY IN BGQ".

TECHNICAL FIELD

The present disclosure generally relates to multi-core processors and, more particularly, to thermal and power management in a System-On-A-Chip (SOC).

BACKGROUND

Some parallel computing devices include node architectures based upon SOC technology, i.e., each processing node comprises a single Application Specific Integrated Circuit (ASIC). Each ASIC node includes a plurality of processors, which may be used individually or simultaneously, to work on any combination of computations or communications as required by a particular algorithm being solved and executed at any point in time.

Developments in SOC technology have led to an increase in on-chip clock frequencies, the number of transistors on a single chip and the die-size itself. Often however, these increases may also come with a cost of higher power consumption, which increases as chips decrease in size. Some undesired consequences of chip size reduction may be power consumption concentration, which may sometimes result in local chip hotspots, and static power, which often rises exponentially with increasing ambient temperatures. Also, static power may waste chip energy and shorten chip and system lifetimes as well.

Process variation is often described as a type of variation that occurs when there are differences in multiple instances of the same process. For example, at a SOC chip's design stage, certain technical characteristics, such as supply voltage and frequency, may be specified. However, at chip's manufacturing stage, due to imperfections in the manufacturing process, each chip and its components may exhibit different technical characteristics, i.e. variations, other than those specified at the design stage. Process variation may be attributed to various factors such as difference in transistor threshold voltages (VT), effective channel length and oxide thickness in transistors. Consequently, due to process variation, some SOC chips may exhibit different power and thermal behavior despite running similar workloads.

SUMMARY

In accordance with one exemplary embodiment, there is disclosed a processor-implemented method for improving efficiency of a static core turn-off in a multi-core processor with variation, the method comprising: conducting via a simulation a turn-off analysis of the multi-core processor at the multi-core processor's design stage, wherein the turn-off analysis of the multi-core processor at the multi-core processor's design stage includes a first output corresponding to a first multi-core processor core to turn off conducting a turn-off analysis of the multi-core processor at the multi-core processor's testing stage, wherein the turn-off analysis of the multi-core processor at the multi-core processor's testing stage includes a second output corresponding to a second multi-core processor core to turn off; comparing the first output and the second output to determine if the first output is referring to the same core to turn off as the second output; outputting a third output corresponding to the first multi-core processor core if the first output and the second output are both referring to the same core to turn off.

In accordance with one exemplary embodiment, there is disclosed a processor-implemented method for improving efficiency of a static core turn-off in a multi-core processor with variation, the method comprising: determining via a simulation a condition for core turn-off at a design stage for a certain core of the multi-core processor; assessing whether the condition matches to an actual variation in the certain core, the actual variation measured at a testing stage for the certain core; providing a static core turn-off list based on the matching of the condition and the actual variation in the certain core; selecting a core of the multi-core processor to turn off based on the contents of the static turn-off list.

In accordance with one exemplary embodiment, there is disclosed a computer system for improving efficiency of a static core turn-off in a multi-core processor with variation, the system comprising: a memory; a processor in communications with the computer memory, wherein the computer system is capable of performing a method comprising: conducting via a simulation a turn-off analysis of the multi-core processor at the multi-core processor's design stage, wherein the turn-off analysis of the multi-core processor at the multi-core processor's design stage includes a first output corresponding to a first multi-core processor core to turn off; conducting a turn-off analysis of the multi-core processor at the multi-core processor's testing stage, wherein the turn-off analysis of the multi-core processor at the multi-core processor's testing stage includes a second output corresponding to a second multi-core processor core to turn off; comparing the first output and the second output to determine if the first output is referring to the same core to turn off as the second output; outputting a third output corresponding to the first multi-core processor core if the first output and the second output are both referring to the same core to turn off.

In accordance with one exemplary embodiment, there is disclosed a computer program product for improving efficiency of a static core turn-off in a multi-core processor with variation, the computer program product comprising: a storage medium readable by a processing circuit and storing instructions for execution by the processing circuit for performing a method comprising: conducting via a simulation a turn-off analysis of the multi-core processor at the multi-core processor's design stage, wherein the turn-off analysis of the multi-core processor at the multi-core processor's design stage includes a first output corresponding to a first multi-core processor core to turn off; conducting a turn-off analysis of the multi-core processor at the multi-core processor's testing stage, wherein the turn-off analysis of the multi-core processor at the multi-core processor's testing stage includes a second output corresponding to a second multi-core processor core to turn off; comparing the first output and the second output to determine if the first output is referring to the same core to turn off as the second output; outputting a third output corresponding to the first multi-core processor core if the first output and the second output are both referring to the same core to turn off.

In accordance with another exemplary embodiment, there is disclosed a processor-implemented method for improving efficiency of a static core turn-off in a multi-core processor with variation and a plurality of power modes, the method comprising: using a first output of conducting via a simulation a turn-off analysis of the multi-core processor at the multi-core processor's design stage, wherein the turn-off analysis of the multi-core processor at the multi-core processor's design stage includes the first output corresponding to a first multi-core processor core to turn off and wherein the first output is stored in a data structure performing the function of a look-up table; conducting a turn-off analysis of the multi-core processor at the multi-core processor's testing stage, wherein the turn-off analysis of the multi-core processor at the multi-core processor's testing stage includes a second output corresponding to a second multi-core processor core to turn off; comparing the first output and the second output to determine if the first output is referring to the same core to turn off as the second output; outputting a third output corresponding to the first multi-core processor core if the first output and the second output are both referring to the same core to turn off.

BRIEF DESCRIPTION OF THE DRAWINGS

The objects, features and advantages of the present disclosure will become apparent to one skilled in the art, in view of the following detailed description taken in combination with the attached drawings, in which:

FIG. 4 symbolically shows an exemplary structure of the look-up table exemplarily referred to in FIG. 3;

Figure 1:
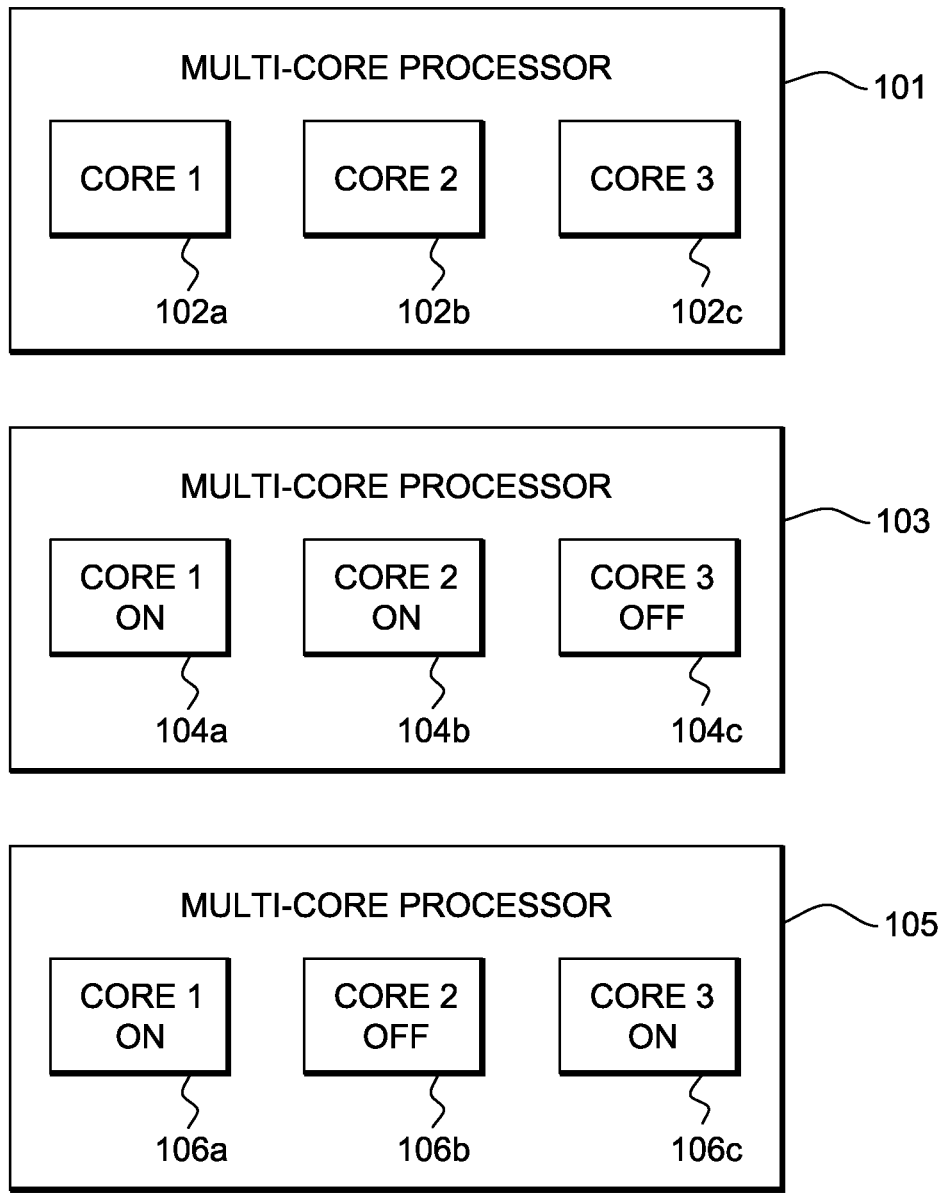
FIG. 1 symbolically illustrates three exemplary scenarios of some the effects some selective core turn-off has on temperature and static power.

The figures listed above depict various exemplary embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION OF THE PREFERRED EMBODIMENTS

Even though the discussion below is relevant to a single-core, dual-core or a multi-core processor, for clarity purposes, the discussion below will generally refer to a multi-core processor device (referred to hereinafter as processor) having at least one processor unit or core.

Moreover, the term "core," as used in the discussion below, generally refers to a digital and/or analog structure having a data storing and/or data processing capability, or any combination of the two. For example, a core may be embodied as a purely storage structure or a purely computing structure or a structure having some extent of both capabilities.

Furthermore, the term "memory," as used in the discussion below, generally refers to any computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), flash memory, solid state memory, firmware or any type of media suitable for storing electronic instructions.

Also, the concept of turning off a core or "selective core turn-off" may be implemented by putting the core in a low-power mode, assigning the core with extremely low-power tasks, or cutting off the supply voltage or clock signal(s) to the core such that it is not usable.

Additionally, a "break-even" condition is a state of being at a particular time that facilitates the evaluation of the ability of a core to tolerate performance variation from its intended original design, i.e. as a result of administering tests that determine how much process variation it takes to change the static (non-time varying) decision of which core or set of cores to turn off.

Moreover, the term "variation," as used in the discussion below, generally refers to process variation, packaging, cooling, power delivery, power distribution and other similar types of variation.

The disclosed technology achieves higher performance and energy efficiency by intelligently selecting which cores to shut down (i.e. turn off or disable) in a multi-core architecture setting. The decision process for core shut down can be done randomly or through a fixed decision (such as always turn off core 1) without any basis for the decision beyond a selecting a fixed core for all chips. In this disclosure, we disclose a technique that optimizes system efficiency through the core shut down decisions—especially in the existence of on-chip variation among processing units.

The disclosed technique can be adjusted for different optimization criteria for different chips, though, for simplicity reasons, we focus on exemplary embodiments for energy efficiency and temperature characteristics. The technique of picking the optimal set of cores to turn off is applicable for multiple objective functions such as Temperature and Energy Efficiency (leakage reduction), which is more related to average temperature than peak temperature. In the case that the scheme is targeting thermal optimization, the technique focuses on (Tpeak, # neighbors) function where the static peak temperature among the processing units can be reduced while reducing the peak temperatures of maximum number of neighbors for the core turn-off candidate under consideration. However, in the case that the scheme is targeting for energy reduction, the same function is multiplied by a factor (Tavg*# neighbors component), which tracks for the average temperature reduction in the maximum number of neighbor cores and the static power dissipation is reduced significantly. By modifying the function in $f(_{Tpeak}$, # neighbors) by $(_{Tavg}$*Area), we optimize for energy efficiency with the same technique.

FIG. 1 symbolically illustrates three exemplary scenarios of some the effects some selective core turn-off has on temperature and static power. FIG. 1 shows similar processors 101, 103 and 105 running a similar workload.

Processor 101 includes three cores 102a-c, of which two, for example, are needed to process a certain workload.

Processor 103 includes cores 104a-c, of which two, for example, are needed to process a certain workload. Due to core scheduling, cores 104a and 104b are turned on and core 104c is turned off. Since cores 104a and 104b are in close physical proximity to each other in the chip, due to their static power dissipation, cores 104a and 104b spatially heat up each other. Consequently, during operation, cores 104a and 104b in sum, consume more static power.

Processor 105 includes cores 106a-c, of which only two are needed to process a certain workload, for example. Due to a core scheduling, for example, cores 106a and 106c are turned on and core 106b is turned off at a given point in time. Since core 106a and 106c are considered not in close physical proximity to each other, they do not spatially heat up each other as much. Consequently, during operation, cores 106a and 106c consume less static power.

It should be noted that although cores 104c and 106b are turned off in their respective scenarios, core 106b, due to its position between the turned on cores 106a and 106c, may be heated at a higher rate than core 104c. Consequently, during operation, core 106b may consume more static power than core 104c in this exemplary scenario.

Exemplary scenarios, as illustrated in FIG. 1, become more complex when cores exhibit variation. For example, if core 106a, due process variation, is significantly hotter than cores 106b and 106c, then turning off core 106b is not the optimal choice for reducing static power. Thus, in the existence of variation, since processing units, such as cores, are not identical in terms performance, power and temperature characteristics, the process of selecting which core to turn off is important with performance, power, temperature, and reliability implications. As a result, the core turn-off decision is non-trivial and requires specialized techniques as explained in this disclosure.

One way to determine the optimal set of cores to turn off is by performing exhaustive tests on each processor after the processor is manufactured. By operating each core, measuring the static power and trying all the combinations of cores to turn on/off, the combination of which cores to turn on/off that exhibit the lowest power consumption may be found. However, this brute force method is overly time consuming and costly due to increased testing time in manufacturing and the costs associated with testing equipment and testing time. Furthermore, the costs become even more prohibitive when the number of cores increases to tens or even beyond hundreds and the number of cores to shut down is more than one.

Figure 2:
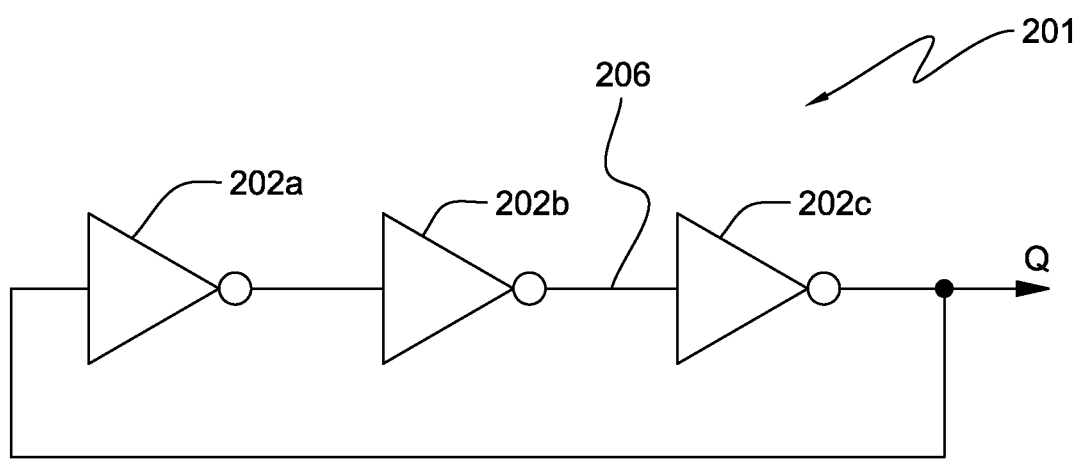
FIG. 2 symbolically illustrates an exemplary embodiment of a ring oscillator that may be adapted to measure process variation for a core.

FIG. 2 symbolically illustrates an exemplary embodiment of a ring oscillator that may be adapted to measure process variation for a core. In one exemplary embodiment, ring oscillator 201 includes three or more serially connected inverters 202a-c operably attached to form an inverter chain 206. The output "Q" of last inverter 202c is fed back as an input into the first inverter 202a. Ring oscillator 201 may be implemented using a number of different kinds of logic such as SRAM. While the variation measuring technique often relies on ring oscillators to quantify the amount of on-chip variation, alternative variation characterization techniques can also be used without compromising the variation measuring technique.

Ring oscillator 201 may be adapted to measure variation for a respective core by counting how many times the output signal Q in ring oscillator 201 changes from 0 to 1 and 1 to 0, in a fixed period of time such as within a clock cycle. Since faster transistors typically exhibit a higher rate of outflow of static power, higher counts in ring oscillator 201 imply that the core consumes more static power.

Additionally, ring oscillator 201 may be positioned within or outside of a core e.g., may be built as components on the SOC in proximity to the respective cores.

Moreover, ring oscillator 201 may be a configured as a Phase-Shift Ring Oscillator (PSRO). Alternative designs of ring oscillator 201 or other devices performing a similar function can also be incorporated in coordination with a PSRO or other variation sensing devices/structures.

Figure 3:
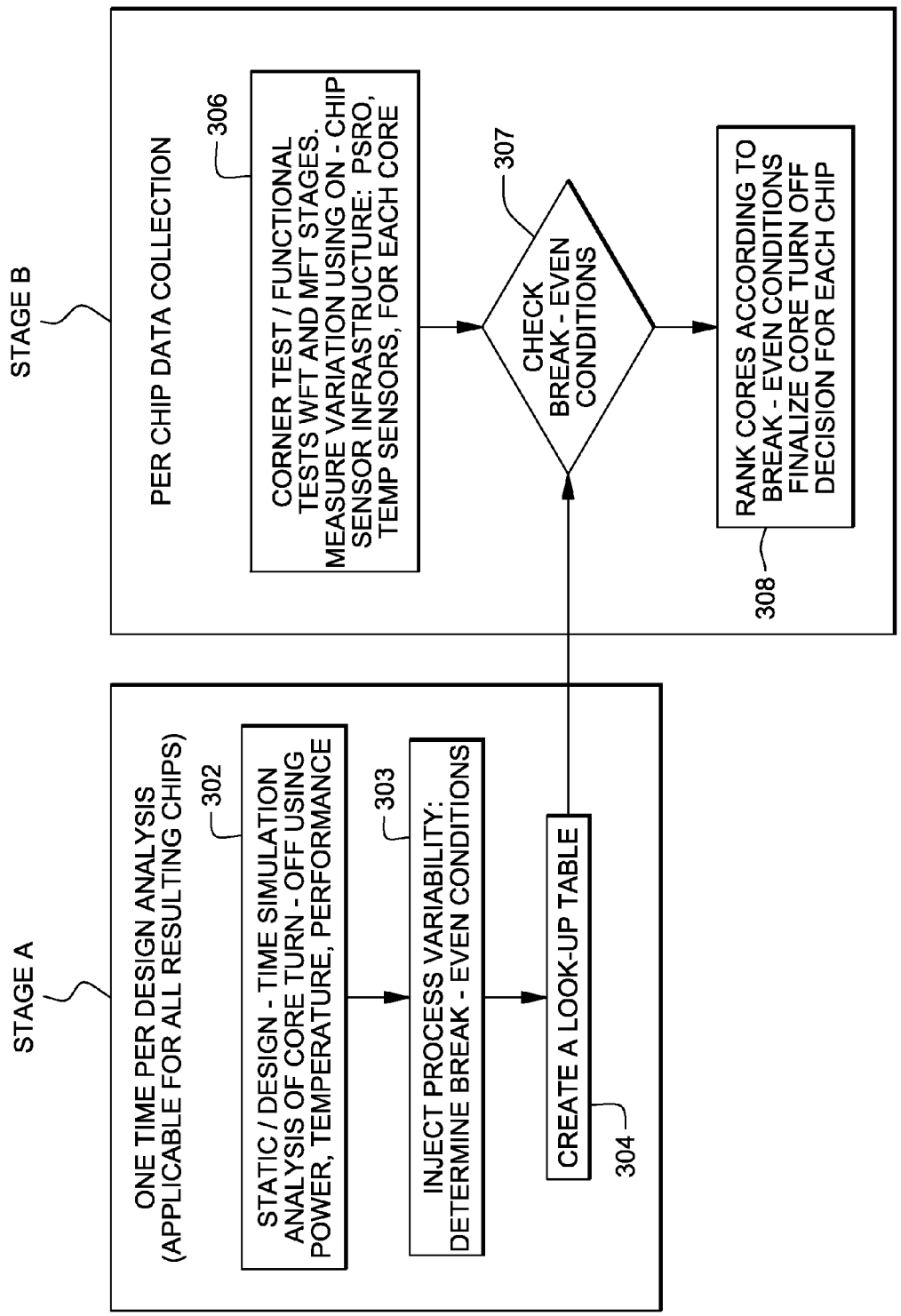
FIG. 3 symbolically illustrates an exemplary depiction of a general overview flowchart of a process for turning off processor cores.

FIG. 3 symbolically illustrates an exemplary depiction of a general overview flowchart of a process for turning off processor cores. In one embodiment, the process performs according to stages, i.e., referred to as Stages A and B. Steps 302-304 in Stage A are performed at the design stage of the processor (before a certain processor design is finalized); and steps 306-308 in Stage B are performed at and/or post the manufacturing stage for each processor. Thus, performance of steps within Stage A takes place prior to performance of steps within Stage B.

Also, in one embodiment, one or all steps within Stage A may be performed on a computer at a chip design facility where the processor chip is being designed.

Additionally, in one embodiment, one or all steps within Stage B may be performed by the processor itself or a computer attached to the processor at the manufacturing facility where the processor chip is being manufactured.

In step 302, a static processor analysis is conducted and its analysis results may be output via a signal. This analysis is conducted by simulating on a computer the operation of the processor running a particular workload. Using the results of the simulation, the computer determines the optimal core or set of cores to turn off given the particular workload. Since this analysis may, in one embodiment, take into consideration some static thermal (e.g. detailed temperature values for individual processing units, macros, cores, temperature maps and such), power (e.g. static and dynamic power dissipation for macros, units or cores) and performance characteristics (e.g. data measured by performance counters, clock frequency, instructions per cycle and bytes per second and such) of the processor (by utilizing known thermal, power and performance models), the resulting processor configurations may be ranked, individually or in combination, by optimal thermal, power and/or performance characteristics. This data may be output as one or more signals for later use in subsequent steps such as step 303. This signal(s) may include data corresponding to a static list of processor cores to turn off.

Also, throughout execution of step 302, the absence of variation is assumed.

Additionally, the simulation in step 302 includes scenarios where the processor has various power modes to reduce power and/or to implement shut-down. Processor power modes are a range of operating modes that selectively shut down and/or reduce the voltage/frequency of parts or all of the processor in order to improve the power-energy efficiency. It is possible that power modes may include full shut down and/or drowsy modes of processing cores and cache structures.

In step 303, at least one break-even condition is determined by utilizing data from step 302 and data from a preexisting library of various variation patterns. This determination is done by simulating on a computer the occurrence of a particular variation pattern on the optimal core or set of cores to turn off given the particular workload employed in the analysis at step 302. Consequently, a list of break-even conditions providing for a switch from one decision of the optimal core or set of cores to turn off (without the effects of variation) to another different set (with the effects of variation) is determined and output via a signal. This signal may be used by subsequent steps, such as step 304.

Also, the simulation of the occurrence of a particular variation pattern on the optimal core or set of cores to turn off given the particular workload employed in the analysis at step 302 may be conducted via a computational algorithm that relies on repeated injection of variation patterns. The variation patterns may be taken from preexisting library of variation patterns for a specific manufacturing site, manufacturing technology and relevant processor assumptions. In one embodiment, the injection algorithm also stores information from earlier runs of the chip under investigation to converge on most frequent variation patterns. While the variation can be largely due to process variation, the injection technique does not discriminate the source of variation and thus can effectively be used with other sources of variation such as packaging, cooling, power delivery, power distribution and such. In an embodiment where the same design is manufactured in a different technology node, or a different site, the preexisting libraries may be customized for these assumptions and thus, the static analysis in this stage will be targeted towards the specific manufacturing technology and site.

In step 304, the output list of break-even conditions of step 303 is used to create a data structure, such as a look-up table, where upon the input of the values of a variation of the core, the data structure will output an ordered list of cores to turn off in order to reduce power or to reduce temperature. For example, when using the ordered list, if the objective function is to reduce power and at most three cores could be turned off to still meet a certain performance target, the ordered list is sorted such that turning off the first three cores in the list will provide the optimal power configuration for the same performance.

The data structure, such as a look-up table, may be stored in memory internal or external to the processor. The content of the data structure may be registered, stored, organized and capable of being retrieved from for later use by the processor, a logic device, a resource manager, an initial configuration controller and/or a tester during the performance of step 306.

In step 306, during Wafer Final Test (WFT) and/or Module Final Test (MFT), the variation of each core is assessed using tester infrastructure, on-chip ring oscillator and/or a temperature sensor and stored in a memory (or a combination of any of these). In one embodiment, the measuring involves applying different supply voltages and clock frequencies to a core or all the cores in the processor and determining the signal counts output by the ring oscillator. Consequently, the measuring may provide values that represent variation for each core measured in ring oscillator counts. These values may be output as a signal used by subsequent steps, such as step 307.

In step 307, the process variation values obtained from step 306 are used with look-up table data listing of cores to turn off obtained from step 304 in order to automatically decide which core or set of cores to turn off in the processor. Since the on-chip variation patterns are different for different chips, the turn-off decisions that are unique to a certain processor may be stored within the processor or stored externally with reference to the processor's identification information. The actual decision of which core or set of cores to turn off may be implemented at the manufacturing stage by cutting off the frequency and/or voltage of the selected cores to turn off, or be made available to the systems for applying one of the aforementioned turn-off actions.

In step 308, a list including a core or set of cores to turn off in the processor is finalized and may be output. In one embodiment, the content of the list may be ordered by corresponding core weights/ranks (i.e. cores may be ordered according to the energy or thermal benefit obtained from turning the selected cores off). Thus, a number of cores represented by a variable N and included in this list may be selected and subsequently turned off. Since the content of the list is ordered, a maximum benefit from the core shut down selection may be obtained. The variable N is a parameter which may be defined by a processor manufacturer based on a predetermined performance requirement and can be changed according to a desired number of cores to turn off. For example, the processor manufacturer may set variable N to 6 cores operating at 2 Ghz below 65 W power.

FIG. 4 symbolically shows an exemplary structure of the look-up table exemplarily referred to in FIG. 3. Look-up table 400 includes two columns. The first column lists the break-even conditions and the second column lists the cores to turn off. Each row in look-up table 400 represents a list of tests of variation conditions, where the input variable Count[core] represents variation for each core as characterized by a logic device such as a ring oscillator, e.g., ring oscillator counts obtained for a core in step 306. If the break-even condition listed in the first column for a particular row is met, i.e. resolves TRUE, then the corresponding list o cores to turn off is specified in the same row is used for the corresponding processor.

In one embodiment, the first column of look-up table 400 must cover all the possible combinations of process variations of the corresponding processor such that at least one row will be tested TRUE for every manufactured processor. For example, multiple rows within the first column may be tested TRUE when the processor layout is symmetric, such that turning off core on one end has the same effect of turning off a core from the other end. If more than one row is tested TRUE, then any of the rows that are tested TRUE may be selected i.e. any list of cores to turn off is specified in the any of the rows tested TRUE.

In some cases where some of the cores are non-functional (i.e. not able to operate according to the standards set by the manufacturer) and thus must be turned off, there are less choices from which remaining functional cores can be turned off since the non-functional cores must be turned off and their turn-off will affect the power and the choices for the remaining functional cores to turn off. Consequently, to make use of table 400 when some of the cores must be mandatorily turned off due to their non-functionality, the disclosed technique changes the preexisting content of some cells within table 400 to content corresponding to as if the non-functional cores have already been turned off. This occurs by allowing only the rows of table 400 that have the non-functional cores turned off in the second column (Cores to turn off) to be used for look-up. Also, in one embodiment, conditions listed in the first column that involve disabling the non-functional cores must be removed. For example, in table 400, if two cores should be turned off and if a core 3 has to be turned off due to its non-functionality in a particular processor, then only rows 2, 3, 4 and 6 (those rows that already have core 3 as one of the first two cores to be turned off) will be used for this processor. Thus, in order to determine which of the remaining cores should be turned off, the conditions that involves core 3 such as count[core 1]>count[core 3] and count[core 1]<=count[core 3] are removed from column 1, without using the actual counts or actual evaluation of core 3.

Also, look-up table 400 may be stored in memory internal or external to the processor. The content of the data structure may be registered, stored, organized and capable of being retrieved from for later use by the processor, a logic device, a resource manager, an initial configuration controller and/or a tester during the performance of step 306.

Figure 5:
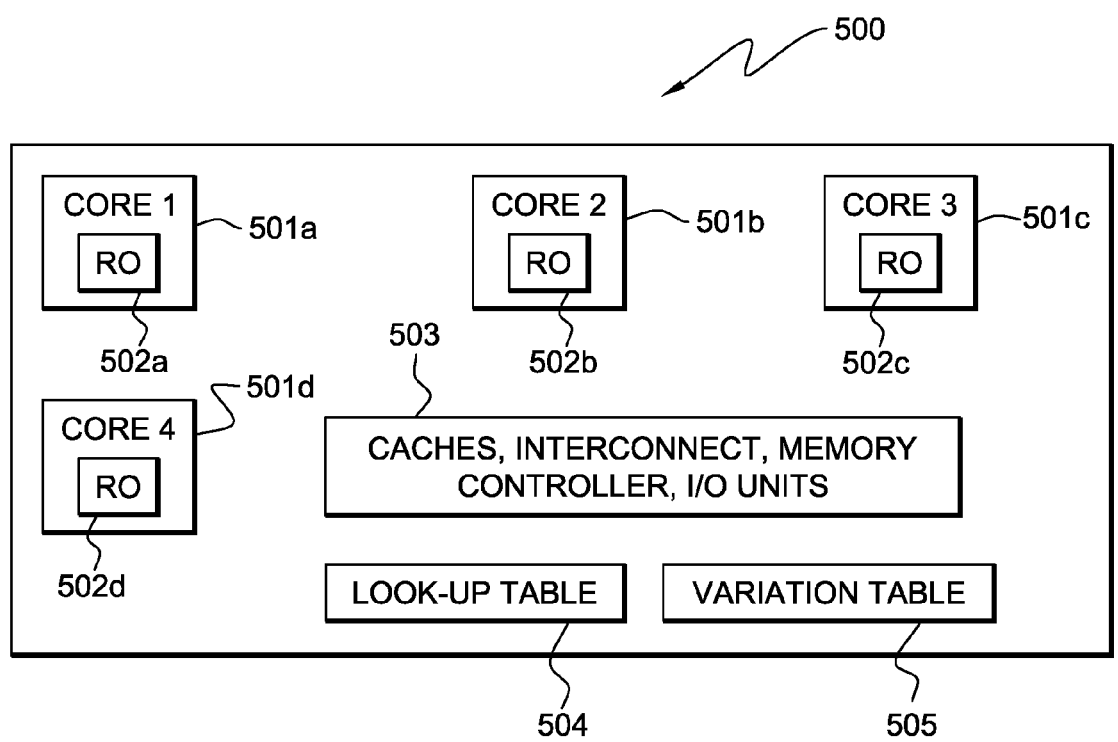
FIG. 5 illustrates a functional block diagram of an exemplary embodiment of a processor configured to implement the process of FIG. 3.

FIG. 5 illustrates a functional block diagram of an exemplary embodiment of a processor configured to implement the process of FIG. 3. In this embodiment, a processor 500 includes four processor cores 501a-d. Each of the processor cores is coupled to one of respective ring oscillators 502a-d, however, in some cases where the core is large, more than one ring oscillators may be used. Because close-by transistors tend to exhibit similar behavior under variation, ring oscillators 502a-d may be placed closed to, and often within, the core.

Processor 500 also includes other units such as caches, interconnect, memory controller and Input/Output, collectively marked as Block 503 that are typically found on a multiprocessor and SOC devices. Because Block 503 may consume active and static power and may be affected by temperatures of the cores, as well as possibly heating up the cores due to their close proximity with one or more cores close-by, circuitry of Block 503 may be used in the analysis referred to in FIG. 3 as step 301.

Block 504 is the logic circuit corresponding to the look-up table by referred to FIG. 3 in step 304.

Block 505 is the logic circuit corresponding to a variation table, storing values of ring oscillator readings referred to in FIG. 3 as step 306. Data output from Blocks 504 and 505 may assist in implementation of step 307 referred to in FIG. 3.

Figure 6:
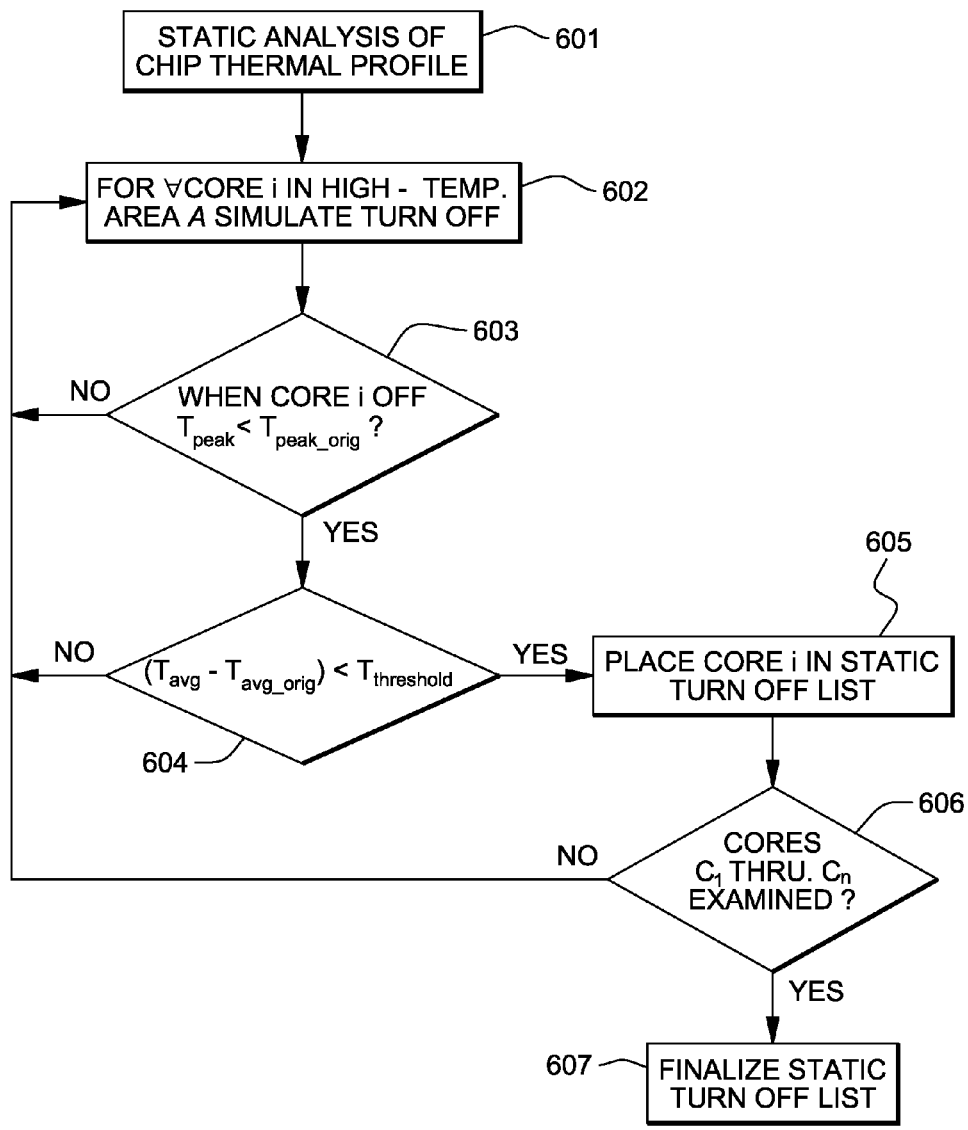
FIG. 6 symbolically illustrates the steps of an exemplary process for generating a static turn-off list.

FIG. 6 symbolically illustrates the steps of an exemplary process for generating a static turn-off list. These steps are referred to as step 302 in FIG. 3.

In step 601, a static analysis of the processor's thermal profile is conducted. The static analysis is conducted in order to minimize the overhead associated with the static analysis without compromising accuracy. The static analysis includes a determination of the processor's thermally critical regions R where the average temperature of a region is higher than a predetermined threshold temperature, which is based on the analysis of the processor architecture and determined after extensive analysis at the design stage. The determination of the processor's thermally critical regions R occurs by computer simulation, whereby the processor's map-like physical layout is recursively separated into multiple sections. Next, the average temperature corresponding to a variable $T_{average}$ is calculated for each processor section and compared with the other processor sections as well as the whole processor's average temperature over a certain period of time. Next, a list of thermally critical regions Ri: {R1-RN} is provided. All the thermally critical regions R1-RN are evaluated in steps 602-607. Furthermore, each region Ri is defined by a number of cores (C1-CN) as well as mapping coordinates (x1, x2, y1, y2) on the layout of the chip. Upon determination of the thermally critical regions, the subsequently performed steps focus on regions Ri without doing the analysis exhaustively for every single core on the chip. Also, architectural criticality may be factored in this step where if, for example, Region 1 has operational significance for a particular processor architecture, then Region 1 can still be in the list or may be overwritten.

In step 602, core turn-off is simulated for all cores in region R. Turn-off simulation may occur by selecting an $I^{th}$ core among M cores (e.g. $2^{nd}$ core out of 10 cores) where M is the total number of cores on the processor and I is a predetermined constant for the given number of cores/chip area such that I/M cores are neighboring cores from a region R (x1, x2, y1, y2) in the thermally critical regions. Consequently, for example, if N cores out of M should be turned off, then all the combinations of turning off N cores out of M cores are exhaustively simulated for the occurrence of various power and thermal scenarios on each combination until all the combinations are tried and the optimal combination is chosen.

In step 603, a determination is made whether the peak temperature of a selected core I, which is turned off during simulation, is less than its peak original temperature. If not, then process loops back to step 602. Otherwise, step 604 is executed.

In step 604, a determination is made whether the difference between the current average temperature and original average temperature is less than the threshold temperature. If not, then the process loops back to step 602. Otherwise, step 605 is executed.

In step 605, information identifying the simulated core is placed in a static turn-off list. Static turn-off list is an ordered list wherein the listed cores are weighted/ranked according to the amount of energy efficiency and temperature improvement achievable through turning the listed cores off. In one embodiment, the weights may be based on ΔT where average ΔT would also indicate leakage and corresponding energy efficiency improvement i.e. the amount of temperature reduction (in terms of peak and/or average temperature) if a certain core is turned off. In one embodiment, the step of deciding how much power/temperature savings could be achieved by turning off a particular core can be extended to include the amount of static power reduction that translates to the level of temperature reduction. Consequently, if variation is lacking, then data from the performance of step 605 can be subsequently used to assist in turn-off of any number of cores by selecting N cores out of this ordered list in order. While the static turn-off list may be subsequently partially overwritten by breakeven conditions (see for example FIG. 7), however, if the test-time measurements indicate that variation is below a predetermined variation $V^{th}$ threshold, the static turn-off list is still valid and can be used to turn off any number of cores on the chip for maximum energy efficiency (static power reduction) and/or thermal improvement. For example, in an embodiment where the main goal of the disclosed technology is energy efficiency optimization, the average power and total area are taken into account when the listed cores are weighted/ranked. Thus, it is possible that two different static turn-off lists can be simultaneously maintained and the core turn-off selection may be done according to a certain goal, which may or may not be determined at that time. Additionally, similar static turn-off lists can be generated for reliability and other objective functions that are of similar nature.

In step 606, a determination is made as to whether all the cores in region R have been analyzed. If not, then the process loops back to step 602. Otherwise, step 607 is executed.

In step 607, the content of static turn-off list is finalized. The static turn-off list may be output for use by step 303 shown in FIG. 3.

Figure 7:
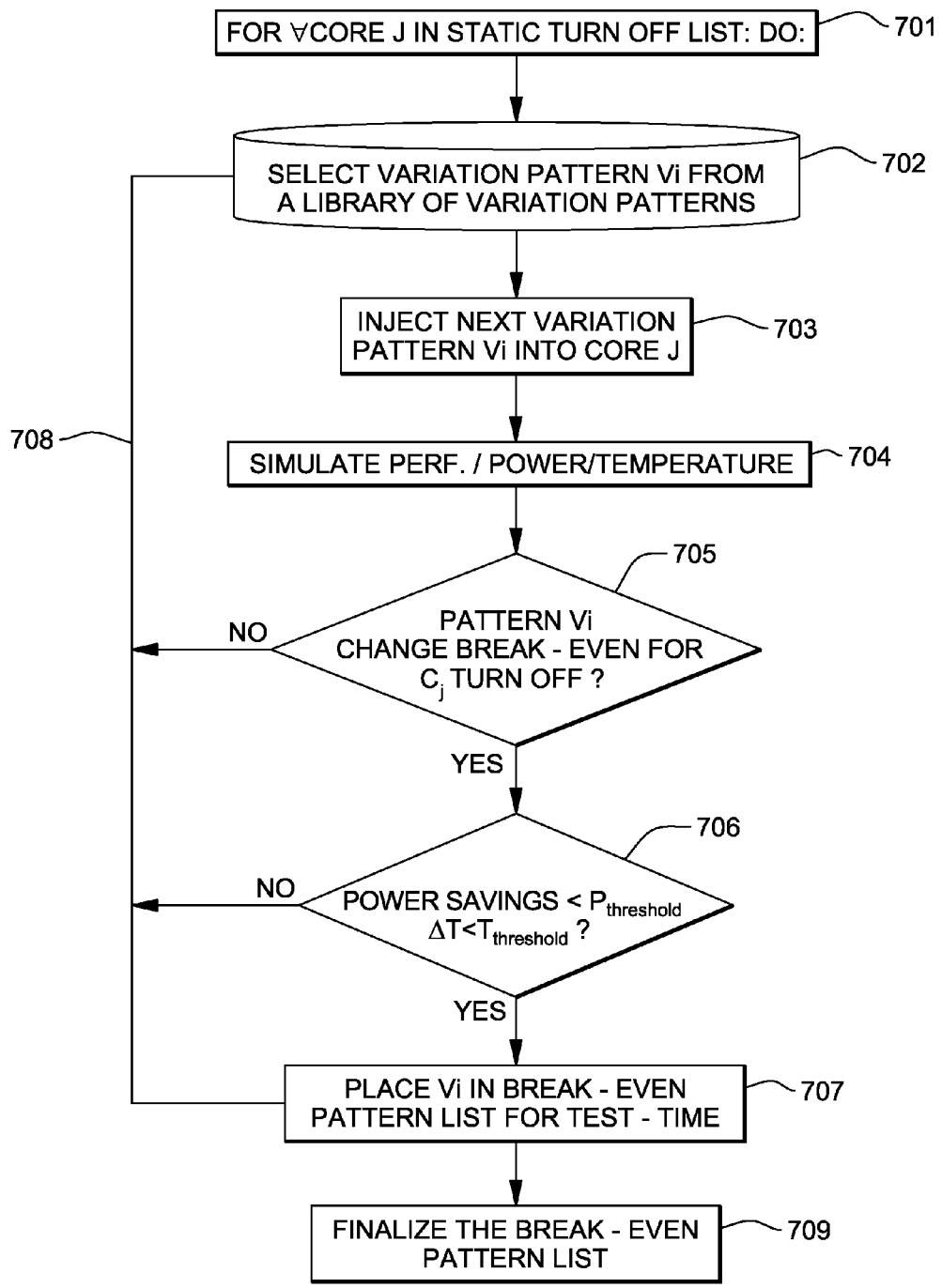
FIG. 7 symbolically illustrates the steps of an exemplary process for injecting variation patterns into a static turn-off list.

FIG. 7 symbolically illustrates the steps of an exemplary process for injecting variation patterns into a static turn-off list. These steps are referred to as step 303 in FIG. 3 and are simulated on a computer at the processor's design stage.

In step 701, a core represented by a variable J from a listing of all cores listed in a static turn-off list is selected. The static turn-off list is provided from the performance of all steps symbolically shown in FIG. 6.

In step 702, a process variation pattern is selected from a preexisting library of various variation patterns. The variation pattern is represented by variable Vi. The variation patterns may be taken from preexisting library of variation patterns for a specific manufacturing site, manufacturing technology and relevant processor assumptions. In one embodiment, the injection algorithm also stores information from earlier runs of the chip under investigation to converge on most frequent variation patterns. While the variation can be largely due to process variation, the injection technique does not discriminate the source of variation and thus can effectively be used with other sources of variation such as packaging, cooling, power delivery, power distribution and such. In an embodiment where the same design is manufactured in a different technology node, or a different site, the preexisting libraries may be customized for these assumptions and thus, the static analysis in this stage will be targeted towards the specific manufacturing technology and site. In one embodiment, the variation pattern may be selected from Block 505 exemplarily shown in FIG. 5.

In step 703, a variation pattern Vi is injected into core J via a computational algorithm during a power and/or temperature simulation.

In step 704, a simulation of the occurrence of variation pattern Vi on core J takes place. This simulation may take into account various performance scenarios, workloads, power schemes and temperatures. Specifically, variation data may include lot/wafer/chip/core/unit level variation data that is relevant for the core under consideration. Given the core architecture characteristics/specifications, an injection of the variation pattern Vi into the corresponding operating specs of the processor occurs. As previously mentioned, the operating specifications can include certain workload characteristics, power modes, temperatures and other scenarios into account in order to do a realistic assessment of the impact of the variation on the processor.

In step 705, a determination is made as to whether the performance results of step 704 on core J are different from those performance results corresponding to core J as determined by step 607 shown in FIG. 6. If not, then the process loops back to step 702. Otherwise, step 706 is executed.

In step 706, a determination is made as to whether the power and temperature values for core J result in maximum energy efficiency (static power reduction) and/or thermal improvement when executing a workload than those corresponding to core J when executing the same workload in step 607 shown in FIG. 6. If not, then the process loops back to step 702. Otherwise, step 707 is executed.

In step 707, process variation pattern Vi is placed in break-even pattern list, which may be stored in a data structure such as a look-up table 400 shown in FIG. 4.

In Step 709, the content of break-even pattern list is finalized. Thus, break-even pattern list per core for all variation patterns from the library of various variation patterns is provided resulting in a listing of break-even points per core such that if a core is above the specific variation level it gets assigned to the break-even pattern list. The break-even pattern list may be output via a signal for subsequent use.

Furthermore, as discussed above in reference to step 308 in FIG. 3, a list including a core or set of cores to turn off in the processor is finalized and may be output. In one embodiment, the content of the list may be ordered by corresponding core weights/ranks (i.e. cores may be ordered according to the energy or thermal benefit obtained from turning the selected cores off). Thus, a number of cores represented by a variable N and included in this list may be selected and subsequently turned off. Since the content of the list is ordered, a maximum benefit from the core shut down selection may be obtained. The variable N is a parameter which may be defined by a processor manufacturer based on a predetermined performance requirement and can be changed according to a desired number of cores to turn off. For example, the processor manufacturer may set variable N to 6 cores operating at 2 Ghz below 65 W power.

There are several methods to execute process in FIG. 7 and those skilled in the art of Computer Automated Design (CAD) can recognize these steps. In one method, known as the Monte Carlo Method, the process is similar to process shown in FIG. 6, but with variations assumptions randomly applied to the cores for random variations only. However, the systematic variations are factored in from analysis of the existing chips for the specific technology/site under investigation. For each set of the injected variations, the process of FIG. 6 is repeated to compute the power and temperature of the chip for each selection of cores to turn off. In the end, the break-even conditions are obtained by grouping range of variation conditions including systematic and random variations that result in the same selection of cores to turn off. In another method known as Simulated Annealing and can be implemented as Linear Programming, a large number of analyses are also done by starting from the resulting list from the process of FIG. 6 assuming no variation, and then incrementally injecting variations such that the break-even conditions are closer at every new analysis.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident, software, micro-code, etc.) or an embodiment combining software and hardware aspects that may all generally be referred to herein as a "circuit," "module" or "system."

Furthermore, aspects of the present disclosure may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of disclosed herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-7 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although the embodiments of the present disclosure have been described in detail, it should be understood that various changes and substitutions can be made therein without departing from spirit and scope of the disclosure as defined by the appended claims. Variations described for the present disclosure can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present disclosure.

Reference in the specification to "one embodiment" or to "an embodiment" means that a particular feature, structure, or characteristic described in connection with the embodiments is included in at least one embodiment. The appearances of the phrase "one embodiment" in various places in the specification are not necessarily all referring to the same embodiment.

We claim:

1. A processor-implemented method for improving efficiency of a core turn-off in a physical multi-core processor with variation, wherein the physical multi-core processor is based upon a multi-core processor design, the method comprising:
   conducting via a simulation a turn-off analysis of the multi-core processor design at a design stage, wherein the turn-off analysis of the multi-core processor design includes a first output corresponding to a core of the multi-core processor design to turn off;
   conducting a turn-off analysis of the physical multi-core processor at a testing stage, wherein the turn-off analysis of the physical multi-core processor includes a second output corresponding to a core of the physical multi-core processor to turn off;
   comparing the first output and the second output to determine if the core referred to by the first output is the same core as the core referred to by the second output; and
   outputting a third output corresponding to the core referred to by both the first output and the second output if the comparing indicates that the core referred to by the first output is the same core as the core referred to by the second output.

2. The method of claim 1, further comprising turning off the core of the physical multi-core processor corresponding to the third output.

3. The method of claim 1, wherein the turn-off analysis of the multi-core processor design at the design stage includes a static multi-core processor analysis conducted under an absence of variation and a first result of the static multi-core processor analysis is output and wherein an occurrence of a variation pattern is simulated on the first result and a second result is output and wherein the second result quantifies the occurrence of the variation pattern on the first result and the second result is output via a signal.

4. The method of claim 3, wherein the variation pattern is selected from a library of variation patterns and wherein the second result is output into a data structure.

5. The method of claim 4, wherein the data structure performs a function of a look-up table.

6. The method of claim 3, wherein the static multi-core processor analysis takes into consideration at least one of the following: a thermal characteristic of the multi-core processor design, a power characteristic of the multi-core processor design and a performance characteristic of the multi-core processor design.

7. The method of claim 1, wherein the multi-core processor design has a plurality of power modes.

8. The method of claim 3, wherein the variation pattern includes data corresponding to at least one of the following: process variation, packaging, cooling, power delivery and power distribution.

9. The method of claim 1, wherein the turn-off analysis of the physical multi-core processor at the testing stage is conducted during at least one of the following: a wafer-level test and a module-level test; and wherein the turn-off analysis of the physical multi-core processor includes assessing variation of each core of the physical multi-core processor by at least one of the following: a variation tester, a ring oscillator and a temperature sensor.

10. A processor-implemented method for improving efficiency of a core turn-off in a physical multi-core processor with variation, wherein the physical multi-core processor is based upon a multi-core processor design, the method comprising:
determining via a simulation at a design stage a condition for core turn-off for a certain core of the multi-core processor design;
assessing whether the condition matches an actual variation in the certain core of the physical multi-core processor, the actual variation measured at a testing stage of the physical multi-core processor;
providing a core turn-off list based on the matching of the condition and the actual variation in the certain core; and
selecting a core of the physical multi-core processor to turn off based on the contents of the turn-off list.

11. The method of claim 10, wherein the determining step includes a static multi-core processor analysis of the multi-core processor design conducted under an absence of variation and a first result of the static multi-core processor analysis is output and wherein an occurrence of a variation pattern is simulated on the first result and a second result is output into a data structure and wherein the second result quantifies the occurrence of the variation pattern on the first result.

12. The method of claim 11, wherein the data structure performs a function of a look-up table.

13. The method of claim 12, wherein the multi-core processor design has a plurality of power modes and wherein the static multi-core processor analysis takes into consideration at least one of the following: a thermal characteristic of the multi-core processor design, a power characteristic of the multi-core processor design and a performance characteristic of the multi-core processor design.

14. The method of claim 11, wherein the variation pattern includes data corresponding to at least one of the following: process variation, packaging, cooling, power delivery and power distribution.

15. The method of claim 13, wherein the actual variation is measured during at least one of the following: a wafer final test and module final test; and wherein the actual variation is measured by at least one of the following: a variation tester, a ring oscillator and a temperature sensor.

16. A computer system for improving efficiency of a core turn-off in a physical multi-core processor with variation, wherein the physical multi-core processor is based upon a multi-core processor design, the system comprising:
a computer memory;
a processor in communications with the computer memory, wherein the computer system is capable of performing a method comprising:
conducting via a simulation a turn-off analysis of the multi-core processor design at a design stage, wherein the turn-off analysis of the multi-core processor design includes a first output corresponding to a core of the multi-core processor design to turn off;
conducting a turn-off analysis of the physical multi-core processor at a testing stage, wherein the turn-off analysis of the physical multi-core processor includes a second output corresponding to a core of the physical multi-core processor to turn off;
comparing the first output and the second output to determine if the core referred to by the first output is the same core as the core referred to by the second output; and
outputting a third output corresponding to the core referred to by both the first output and the second output if the comparing indicates that the core referred to by the first output is the same core as the core referred to by the second output.

17. The computer system of claim 16, further comprising turning off the core of the physical multi-core processor corresponding to the third output.

18. The computer system of claim 16, wherein the turn-off analysis of the multi-core processor design at the design stage includes a static multi-core processor analysis conducted under an absence of variation and a first result of the static multi-core processor analysis is output and wherein an occurrence of a variation pattern is simulated on the first result and a second result is output and wherein the second result quantifies the occurrence of the variation pattern on the first result and the second result is output via a signal into a data structure and wherein the variation pattern is selected from a library of variation patterns.

19. The computer system of claim 18, wherein the data structure performs a function of a look-up table.

20. The computer system of claim 18, wherein the static multi-core processor analysis takes into consideration at least one of the following: a thermal characteristic of the multi-core processor design, a power characteristic of the multi-core processor design and a performance characteristic of the multi-core processor design.

21. The computer system of claim 18, wherein the multi-core processor design has a plurality of power modes and wherein the turn-off analysis of the physical multi-core processor at the testing stage is conducted during at least one of the following: a wafer final test and a module final test; and wherein the turn-off analysis of the physical multi-core processor at the testing stage includes assessing variation of each core of the physical multi-core processor by at least one of the following: a variation tester, a ring oscillator and a temperature sensor.

22. A computer program product for improving efficiency of a core turn-off in a physical multi-core processor with variation, wherein the physical multi-core processor is based upon a multi-core processor design, the computer program product comprising:
a storage device readable by a processing circuit and storing instructions for execution by the processing circuit, wherein said storage device is not propagating signal, for performing a method comprising:
conducting via a simulation a turn-off analysis of the multi-core processor design at a design stage, wherein the turn-off analysis of the multi-core processor design includes a first output corresponding to a core of the multi-core processor design to turn off;
conducting a turn-off analysis of the physical multi-core processor at a testing stage, wherein the turn-off analysis of the physical multi-core processor includes a second output corresponding to a core of the physical multi-core processor to turn off;
comparing the first output and the second output to determine if the core referred to by the first output is the same core as the core referred to by the second output; and
outputting a third output corresponding to the core referred to by both the first output and the second output if the comparing indicates that the core referred to by the first output is the same core as the core referred to by the second output.

23. The computer program product of claim 22, further comprising turning off the core of the physical multi-core processor corresponding to the third output and wherein the turn-off analysis of the multi-core processor design at the design stage includes a static multi-core processor analysis conducted under an absence of variation and a first result of the static multi-core processor analysis is output and wherein an occurrence of a variation pattern is simulated on the first result and a second result is output wherein the second result quantifies the occurrence of the variation pattern on the first result and the second result is output via a signal into a data structure and wherein the data structure performs a function of a look-up table and wherein the variation pattern is selected from a library of variation patterns.

24. The computer program product of claim 23, wherein the multi-core processor design has a plurality of power modes and wherein the static multi-core processor analysis takes into consideration at least one of the following: a thermal characteristic of the multi-core processor design, a power characteristic of the multi-core processor design and a performance characteristic of the multi-core processor design; and wherein the turn-off analysis of the physical multi-core processor at the testing stage is conducted during at least one of the following: a wafer final test and a module final test; and wherein the turn-off analysis of the physical multi-core processor at the testing stage includes assessing variation of each core of the physical multi-core processor by at least one of the following: a variation tester, a ring oscillator and a temperature sensor.

25. A processor-implemented method for improving efficiency of a core turn-off in a physical multi-core processor with variation and a plurality of power modes, wherein the physical multi-core processor is based upon a multi-core processor design, the method comprising:

conducting via a simulation a turn-off analysis of the multi-core processor design at a design stage, wherein the turn-off analysis of the multi-core processor design includes a first output corresponding to a core of the multi-core processor design to turn off and wherein the first output is stored in a data structure performing a function of a look-up table;

conducting a turn-off analysis of the physical multi-core processor at a testing stage, wherein the turn-off analysis of the physical multi-core processor includes a second output corresponding to a core of the physical multi-core processor to turn off;

comparing the first output and the second output to determine if the core referred to by the first output is the same core as the core referred to by the second output; and outputting a third output corresponding to the core referred to by both the first output and the second output if the comparing indicates that the core referred to by the first output is the same core as the core referred to by the second output.

26. The method of claim 25, further comprising turning off a core of the physical multi-core processor corresponding to the third output and wherein the turn-off analysis of the physical multi-core processor at the testing stage is conducted during at least one of the following: a wafer-level test and a module-level test; and wherein the turn-off analysis of the physical multi-core processor at the testing stage includes assessing variation of each core of the physical multi-core processor by at least one of the following: a variation tester, a ring oscillator and a temperature sensor.

27. The method of claim 26, wherein the turn-off analysis of the multi-core processor design at the design stage includes a static multi-core processor analysis conducted under an absence of variation and a first result of the static multi-core processor analysis is output and wherein an occurrence of a variation pattern is simulated on the first result and a second result is output via a signal and wherein the second result quantifies the occurrence of the variation pattern on the first result.

* * * * *